United States Patent
Mannava et al.

(10) Patent No.: US 7,831,776 B2
(45) Date of Patent: Nov. 9, 2010

(54) DYNAMIC ALLOCATION OF HOME COHERENCY ENGINE TRACKER RESOURCES IN LINK BASED COMPUTING SYSTEM

(75) Inventors: Phanindra K Mannava, Folsom, CA (US); Vivek Garg, Folsom, CA (US); Stan Domen, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 897 days.

(21) Appl. No.: 11/580,738

(22) Filed: Oct. 12, 2006

(65) Prior Publication Data

US 2008/0091825 A1 Apr. 17, 2008

(51) Int. Cl.
*G06F 12/00* (2006.01)

(52) U.S. Cl. .................................... 711/144

(58) Field of Classification Search ............ None
See application file for complete search history.

(56) References Cited

U.S. PATENT DOCUMENTS 5,996,034 A * 11/1999 Carter .................... 710/100
2008/0005338 A1 * 1/2008 Yin ........................ 709/228

* cited by examiner

*Primary Examiner*—Hiep T Nguyen
(74) *Attorney, Agent, or Firm*—Blakely, Sokoloff, Taylor & Zafman LLP (57) ABSTRACT

A home agent allocates trackers to each of a plurality of caching agents, monitors each caching agent's usage of the allocated trackers, and determines whether a caching agent under-utilizes or over-utilizes them. In the case of under-utilization, the home agent retrieves at least one tracker from the allocation to the caching agent. In the case of over-utilization, the home agent allocates more trackers to the caching agent.

37 Claims, 8 Drawing Sheets

301 (Tracker)

| | 0 | 1 | 2 | 3 |
|---|---|---|---|---|
| 0 | 0 | 1 | 2 | 3 |
| 1 | ... | ... | ... | ... |
| ⋮ | | ... | | |
| 62 | ... | ... | ... | ... |
| 63 | ... | ... | ... | ... |

FIG. 8

DYNAMIC ALLOCATION OF HOME COHERENCY ENGINE TRACKER RESOURCES IN LINK BASED COMPUTING SYSTEM

FIELD OF THE INVENTION

The field of invention relates generally to the computer sciences, and more specifically, to a mechanism for allocation of resources of a computing system.

BACKGROUND

Figure 1:
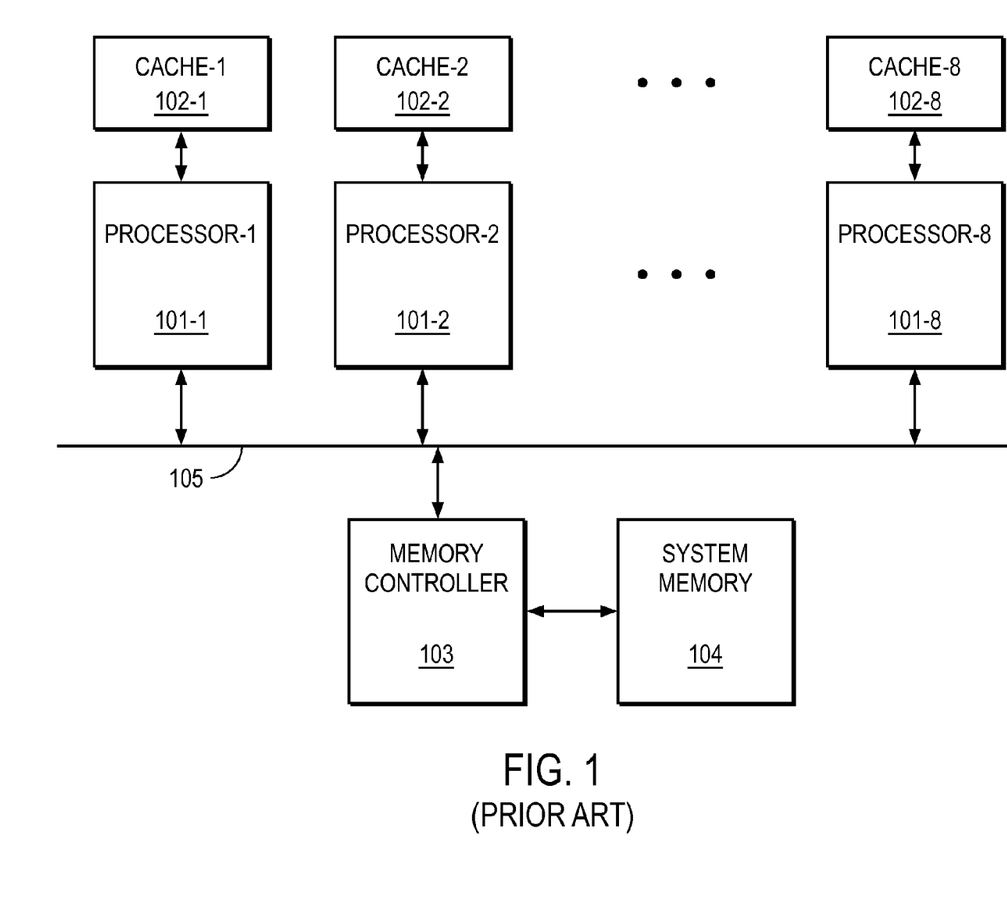
FIG. 1 shows a prior art multi-processor computing system having a shared bus.

Prior art multi-processor computing systems have typically used a shared bus between its one or more processors and a memory controller. FIG. 1 shows a traditional multi-processor prior art computing system. According to the depiction of FIG. 1, the shared bus 105 is a "shared medium" component in which electrical signals passed between any processor and any other processor and/or the memory controller 103 are carried over the same electrical wiring.

The shared bus 105 becomes a bottleneck, particularly for multi-processor systems, because there tends to be heavy communication over the shared bus 105 (through small communicative sessions called "transactions") between the processors 101_1 through 101_8 and the memory controller 103. In order to improve the performance of multi-processor systems, a new architecture has emerged (which may be referred to as "link based") in which the shared bus is replaced with a network having point-to-point links between the processors and memory controller.

Figure 2:
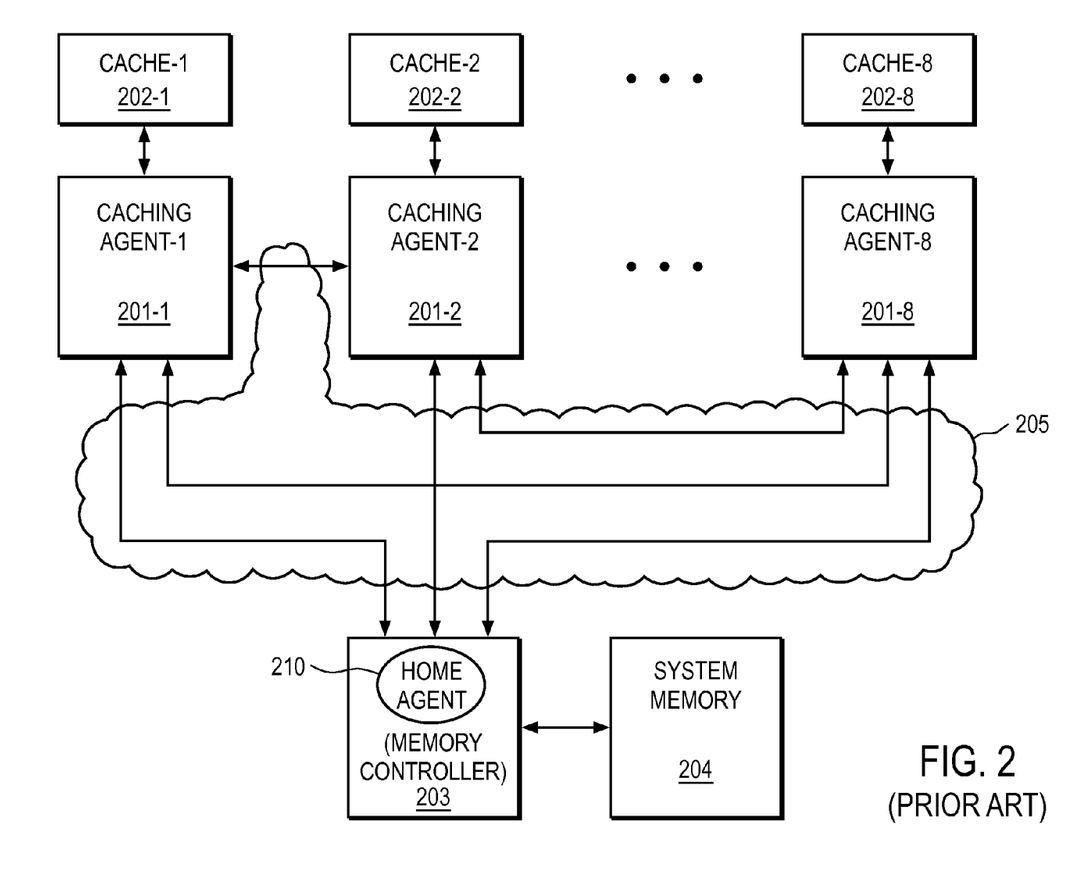
FIG. 2 shows a prior art multi-processor system having a network of point-to-point links in place of a shared bus.

FIG. 2 shows an example. Here, note that the caching agents 201_1 through 201_8 and memory controller 203 are communicatively coupled by a network 205 having point-to-point links between these components. For ease of drawing the point-to-point links are depicted as being bi-directional. Typically, however, these bi-directional point-to-point links are actually implemented with a pair of unidirectional point-to-point links directed in opposite directions with respect to one another. According to the architecture of FIG. 2, a "caching agent" is a unit containing one or more processing cores (e.g., one or more units of logic circuitry that executes program code) that may have associated cache 202_1 through 202_8 for its respective processing cores. In order to access the system memory 204, a caching agent issues a memory request to a home agent 210 of the memory controller 203. The "home agent" of the memory controller 203 is responsible for maintaining coherency of the transactions that the memory controller deals with over network 205. Alternatively, the home agent 210 may be separate from the memory controller 203.

Note that the architecture shown in FIG. 2 may have different number of caching agents and different number of home agents. To simplify the illustration, FIG. 2 only shows one home agent.

Of interest in these systems are the transactions that occur over the network 205 between the caching agents 201_1 through 201_8 and home agent 210 (e.g., to effect coherent caching and shared access to the system memory for data and/or instructions). The cornerstone of a source snoop broadcast protocol that does not use negative acknowledgement is the pre-allocation of tracker resources at the home agent. The tracker resources may be a multiple-entry structure that is used to keep "track" of the state of these transactions. Each entry may represent a tracker. According to this protocol, pre-allocation requires that a caching agent is allocated a tracker prior to sending a memory access request to the home agent. Static partitioning of the trackers divides the trackers into groups. Each group is reserved exclusively for a particular caching agent. To accommodate all outstanding coherent requests from the various caching agents in a multiprocessor configuration, the resulting tracker size (i.e., the number of trackers) in the home agent can be considerably large; or alternatively, the number of requests from each caching agent has to be limited. Either scenario is sub-optional from a performance point of view. Furthermore, the requirement of pre-allocation coupled with static partitioning of the trackers exasperates the tracker size issue.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for dynamic allocation of a home agent's tracker resources are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

One embodiment of the present invention includes a technique that enables dynamic allocation of a home agent's tracker resources to a number of caching agents, which are individually linked to each other and to the home agent. According to the technique, instead of reserving a fixed number of trackers exclusively to each caching agent, the home agent dynamically increases or reduces the number of trackers allocated to each individual caching agent depending on the corresponding caching agent's usage of the trackers already allocated to it, e.g., under-utilization, over-utilization, etc, therefore, providing enough flexibility to enable different classes of caching agents to have different allocations of trackers, and the allocations may be adjusted dynamically based on the utilization at the caching agent or request for increase from a caching agent or based on other heuristics.

Figure 3:
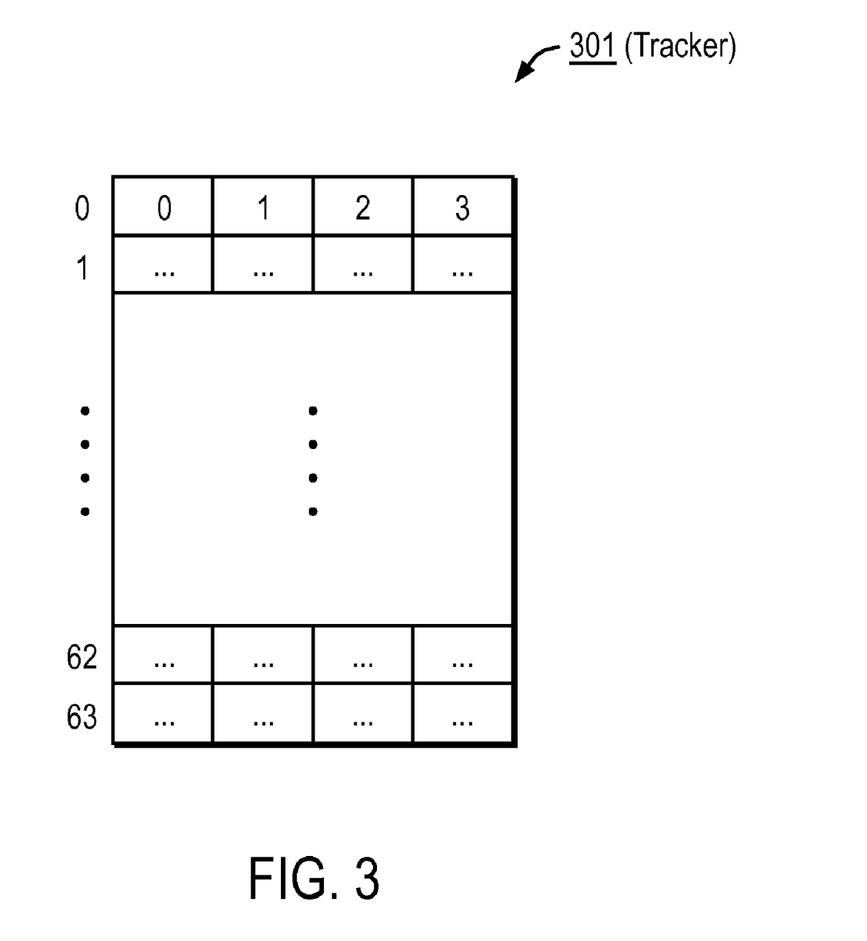
FIG. 3 shows tracker resources at a home agent divided into a plurality of groups according to an embodiment of the present invention.

FIG. 3 shows tracker resources 301 at a home agent. As shown, the tracker resources are divided into 64 groups. Each group includes 4 trackers (each dash representing a tracker).

Thus, the tracker resource 301 has a total number of 256 trackers. A group may also be called a bucket, and may be the granularity of tracker allocation. A group may be as small as including only one tracker. As shown in FIG. 3, each group includes 4 trackers. Each group is assigned a unique group index. Because there are totally 64 groups (or buckets) shown in FIG. 3, the group index is numbered as 0, 1, 2, . . . , 63. As shown in FIG. 3, each group includes 4 trackers, thus a group index combined with an offset within the group uniquely identifies a tracker. For example, (1,0) is the first tracker of the second group.

Please note that a group may be defined to have a different number of trackers other than four. FIG. 3 only shows one example of dividing a plurality of trackers into groups. It is given for illustration purposes, not for restriction purposes.

Figure 4:
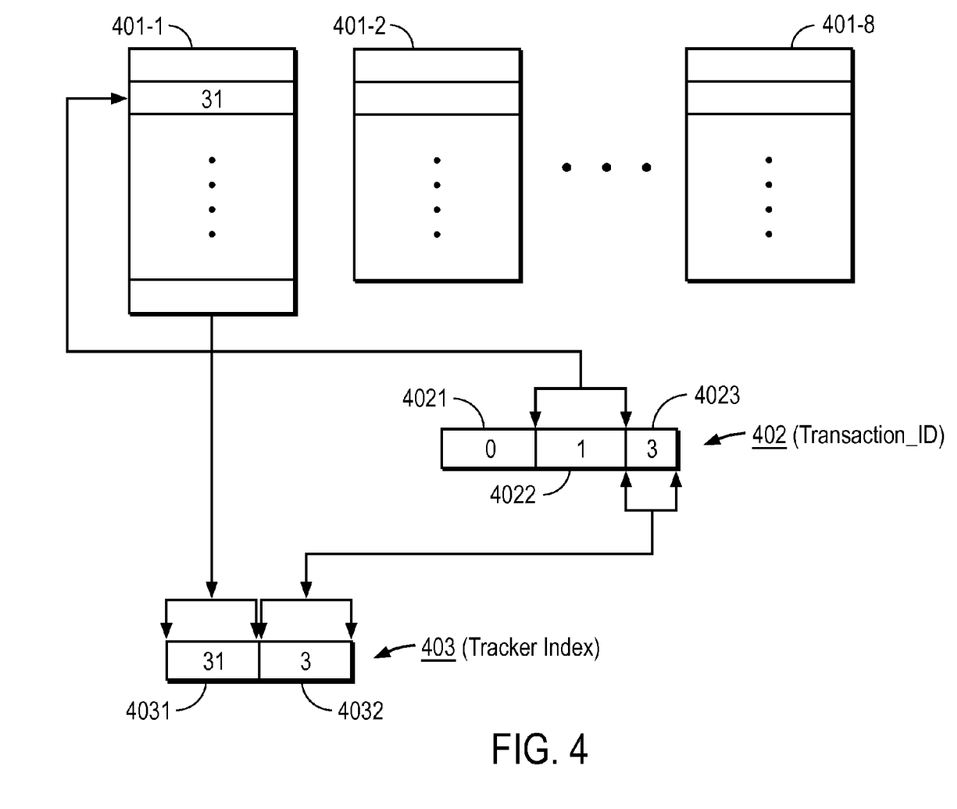
FIG. 4 shows a mapping mechanism according to an embodiment of the present invention.

FIG. 4 shows a mapping mechanism according to an embodiment of the present invention. As shown in FIG. 4, it is assumed that the home agent has 256 trackers which are divided into 64 groups (or buckets), and that the home agent is linked to 8 caching agents, 201-1 through 201-8 (as shown in FIG. 2). For each caching agent, the home agent maintains a separate mapping table, 401-1 through 401-8. A mapping table, for example 401-1, is used to record indexes of groups allocated to the corresponding caching agent. As shown in FIG. 4, a transaction ID 402 at least comprises three portions, a caching agent ID 4021, a mapping table entry index 4022, and an offset 4023. The caching agent ID 4021 identifies the caching agent to which the current transaction is associated. It therefore identifies the mapping table to be used to look up the group index 4031 of the tracker index 403. The mapping table entry index 4022 identifies the entry of the mapping table which contains the group index 4031. The offset 4023 identifies the tracker within a group. The tracker index 403 comprises the group index 4031 and the offset 4032 (which is copied over from the offset 4023 of the transaction ID 402).

For example, as illustrated in FIG. 4, the transaction ID 402 is (0, 1, 3). The caching agent ID 4021 of the transaction ID 402 is "0", which identifies the caching agent 201-1. Thus, mapping table 401-1, which is associated with caching agent 201-1, will be used for looking up the group index 4031 of the tracker index 403. The mapping table index 4022 of transaction ID 402 is "1", thus it is the second entry of mapping table 401-1 that contains the group index 4031. As shown in FIG. 4, the second entry of mapping table 401-1 is "31". Therefore, after copy over the offset 4023 of the transaction ID 402, the tracker index 403 is (31, 3).

As discussed above, a home agent allocates a list of groups to each caching agent and the indexes of the groups are stored in the mapping table for the corresponding caching agent, which is maintained at the home agent. The home agent notifies the caching agent the indexes of those mapping table entries storing the indexes of the groups. Based on these indexes of the mapping table entries, the caching agent maintains a list of free transaction IDs that may be used by the caching agent to issue memory requests to the home agent. Whenever the content of a mapping table changes (because of adding or dropping groups, for example), the change will be communicated to the corresponding caching agent so that it may adjust its list of free transaction IDs. The change at home is not effective until an acknowledgement is received from the caching agent.

Figure 5:
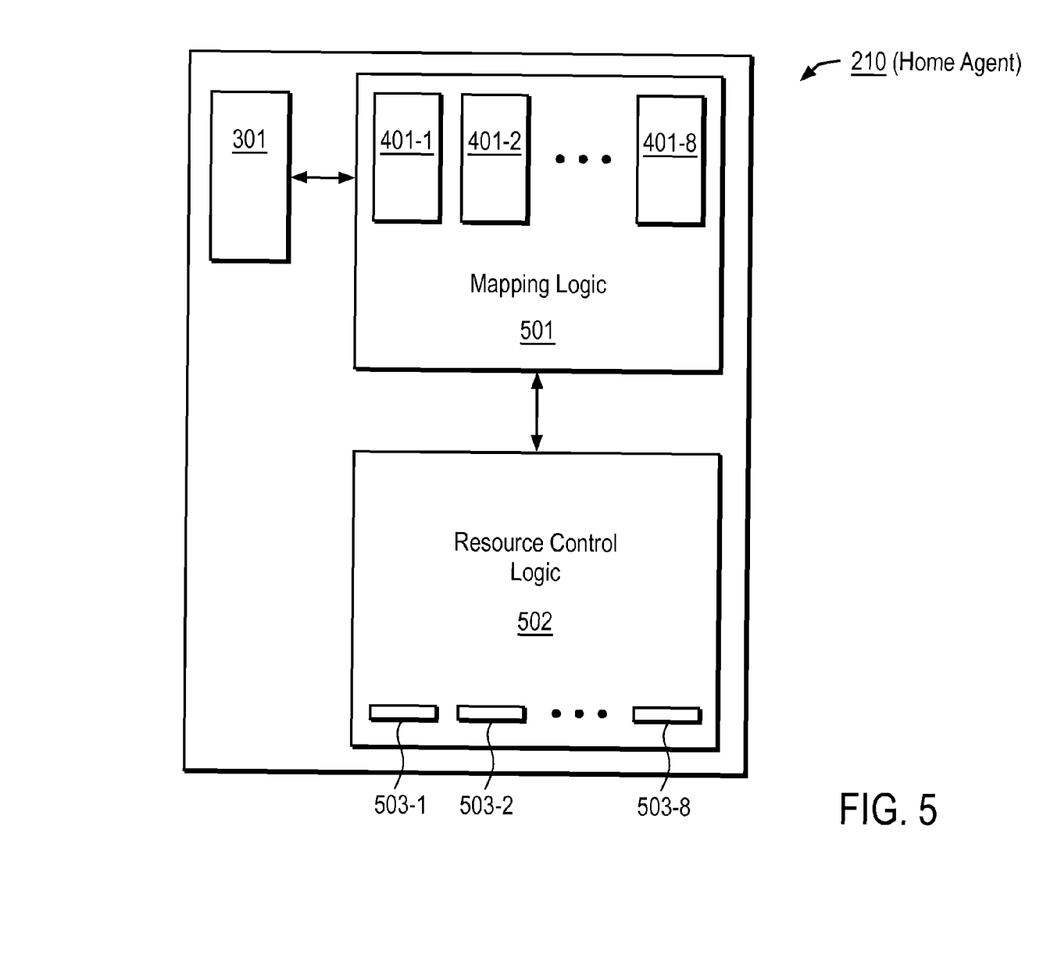
FIG. 5 is a block diagram illustrating a home agent such as shown in FIG. 2.

FIG. 5 is a block diagram illustrating a home agent such as shown in FIG. 2. As shown, home agent 210 maintains the tracker resource 301, a mapping logic 501, and a resource control logic 502. In an embodiment, the mapping logic 501 maintains a set of mapping tables 401-1 through 401-8. The mapping mechanism illustrated in FIG. 4 and discussed above may be implemented by the mapping logic 501.

In an embodiment, the resource control logic 502 maintains eight counters 503-1 through 503-8, respectively associated with each of the eight caching agents 201-1 through 201-8. Each counter records the number of trackers currently being used by the corresponding caching agent. The resource control logic 502 maintains and keeps track of these counters to monitor each caching agent's usage of the trackers allocated to it. The resource control logic 502 periodically determines whether a particular caching agent over-utilizes or under-utilizes the trackers already allocated to it. In the case of over-utilization, tracker utilization consistently staying above a threshold for a pre-determined period of time, for example, the resource control logic 502 allocates more trackers to the particular caching agent and updates the corresponding mapping table. In the case of under-utilization, the resource control logic 502 reduces the number of trackers allocated to the caching agent. The tracker entries thus recovered due to under-utilization may be allocated to other caching agent(s) or be placed in a "free" pool for future distribution. The period between determinations of over-utilization/under-utilization may be a predetermined period or may be changed dynamically based on transaction traffic intensity.

As discussed above, trackers of a home agent may be divided into a number of groups. Thus, trackers may be allocated to the various caching agents in increment of group. The size of the group dictates the complexity of managing the trackers at the home agent. The smaller the group's size is, the more complex the managing task is. On the other hand the smaller the group the tracker allocation may result in more nimble dynamic adaption.

In one embodiment, the present invention dynamically allocates home agent trackers depending on the need of each caching agent, thus providing more efficient use of resources.

Figure 6:
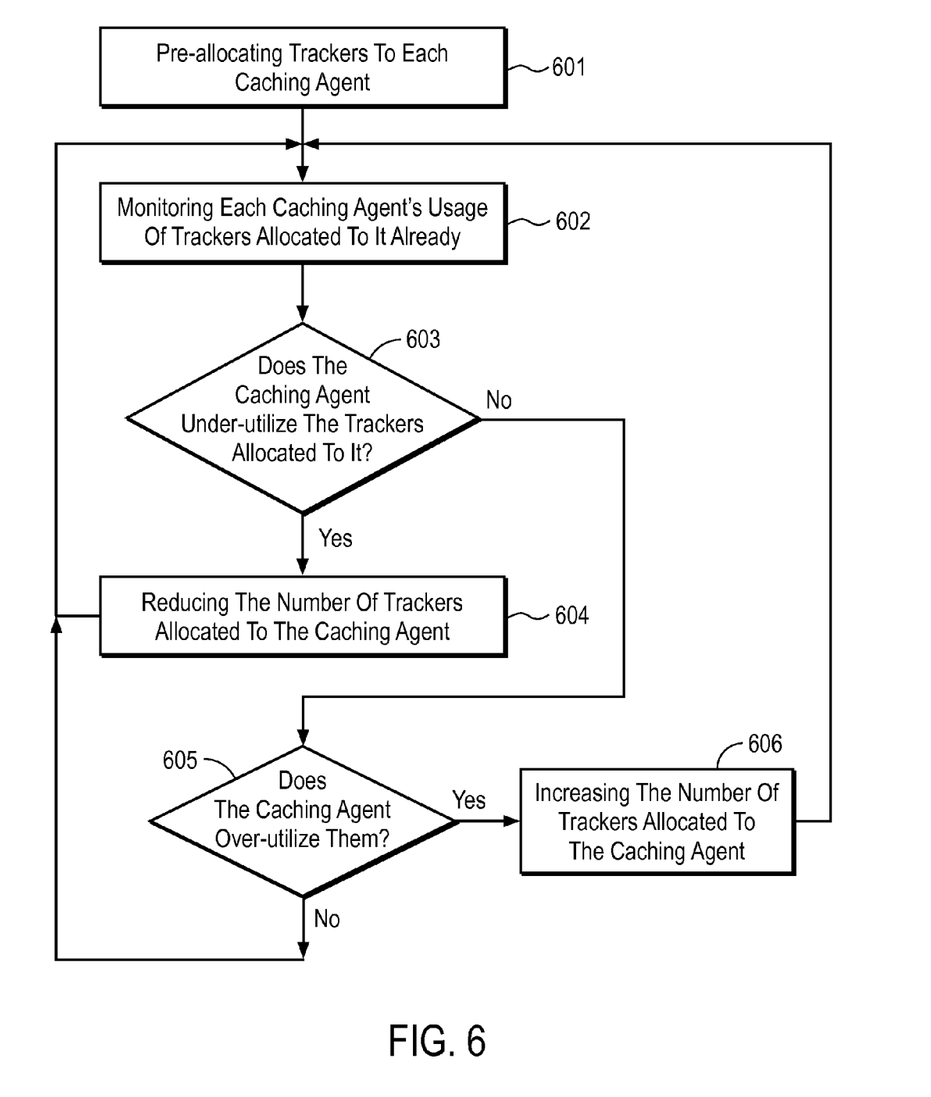
FIG. 6 is a flow diagram illustrating a mechanism for dynamic allocation of a home agent's tracker resources according to an embodiment of the present invention.

FIG. 6 is a flow diagram illustrating in greater detail the mechanism for dynamic allocation of a home agent's tracker resources introduced above in FIG. 5. At block 601, each caching agent 201-1 through 201-8 is assigned a pre-defined fixed number of trackers from the tracker resource 301. Since the tracker resource 301 has 256 trackers, then initially each one of the eight caching agents may be assigned 32 trackers. Further assuming that the 256 trackers are divided into 64 groups, then each caching agent initially gets 8 groups. Note that there are other ways of assigning a pre-defined fixed number of trackers to each caching agent, and the home agent does not need to assign all of its trackers out to the caching agents initially. The above example is used for illustration, not for restriction.

At block 602, the resource control logic 502 monitors each caching agent's usage of trackers allocated to it. An outstanding memory access request from a caching agent is a request of which the memory access operation is not yet finished and/or a response to the request is not yet received by the caching agent. As discussed in the background section, a tracker is like a permit for a caching agent to issue a memory access request to a home agent. For each outstanding memory request issued by a caching agent to a home agent, the caching agent needs to have a tracker allocated to it at the home agent, and one tracker allows only one outstanding request. To use the same tracker for another memory request, the caching agent needs to wait until the tracker is released by deallocation of the transaction regarding the previous memory request. The resource control logic 502 listens to memory requests from each caching agent 201-1 through 201-8, and updates the corresponding counter 503-1 through 503-8.

At block 603, the resource control logic 502 checks whether a caching agent under-utilizes the trackers already allocated to it. For example, to check whether caching agent 201-1 under-utilizes the trackers allocated to it, the resource control logic 502 first checks the corresponding mapping table for caching agent 201-1, which is mapping table 401-1, through the mapping logic, to get the number of trackers allocated to caching agent 201-1. The resource control logic 502 then checks the number of trackers that are currently being used by the caching agent 201-1. It may get this value from the counter 503-1. The resource control logic 502 then calculates the difference between the two values and compares the difference with a threshold. If the difference is equal or greater than the threshold, then the resource control logic 502 decides that caching agent 201-1 under-utilizes the tracker resources. The threshold may be defined as 16, which is the size of 4 groups of trackers. In that case, at block 604, the resource control logic 502 deallocates some of the unused trackers so that they could be allocated to other caching agents, thus reducing the number of trackers allocated to caching agent 201-1. In an embodiment, the deallocation is implemented in a full-handshake fashion. The home agent needs to first inform the caching agent that it is intending to remove a number of trackers from the caching agent. Then the caching agent has to acknowledge that it can give up those resources, or not. Also at block 604, the resource control logic updates the corresponding mapping table 401-1 to reflect the deallocation of trackers from caching agent 201-1. After reducing the number of trackers at block 604, the control of the flow goes back to block 602 to keep monitoring each caching agent's usage of trackers allocated to it.

On the other hand, if the resource control logic 502 decides, at block 603, that caching agent 201-1 does not under-utilize the trackers allocated to it, then at block 605, the resource control logic 502 determines whether caching agent 201-1 over-utilizes the trackers allocated to it. The resource control logic 502 again calculates the difference between the number of trackers allocated to caching agent 201-1 and the number of trackers currently being used by caching agent 201-1. If the difference is less than or equal to another threshold, for example 4 (the size of a group), and has stayed that way for a predetermined period of time, then the resource control logic 502 decides that the caching agent over-utilizes the trackers allocated to it. In that case, at block 606, the resource control logic 502 may decide to allocate more trackers to caching agent 201-1, thus increasing the number of trackers allocated to caching agent 201-1. Also at block 606, the resource control logic updates the corresponding mapping table 401-1 to reflect the allocation of trackers to caching agent 201-1. After allocating more trackers at block 606, the control flow goes back to block 602 again to keep monitoring each caching agent's usage of trackers allocated to it.

In one embodiment, allocation and deallocation of trackers are in an increment of group (or bucket). For example, if a caching agent under-utilizes trackers allocated to it, the resource control logic 502 deallocates a group from the caching agent. Upon a determination by the control logic 502 that the caching agent under-utilizes trackers, the home agent 201 sends the caching agent a deallocation message. Upon receiving the deallocation message, the caching agent determines whether it has a complete group (or bucket) that may be deallocated now, i.e., no tracker in the group is being used for an outstanding memory access request. If so, the caching agent sends a deallocation-confirm message back to the home agent, and the home agent may go ahead deallocate the group from the caching agent. Otherwise, if the caching agent does not have such a group that may be deallocated, the caching agent sends a deallocation-reject message to the home agent. The home agent aborts the deallocation operation. Alternatively, the caching agent may be forced to give up a bucket of trackers when requested by the home agent. It does not have to be immediately, but within some amount of time, which may be equal to n*(the average memory latency), wherein n is the number of trackers per bucket.

Figure 7:
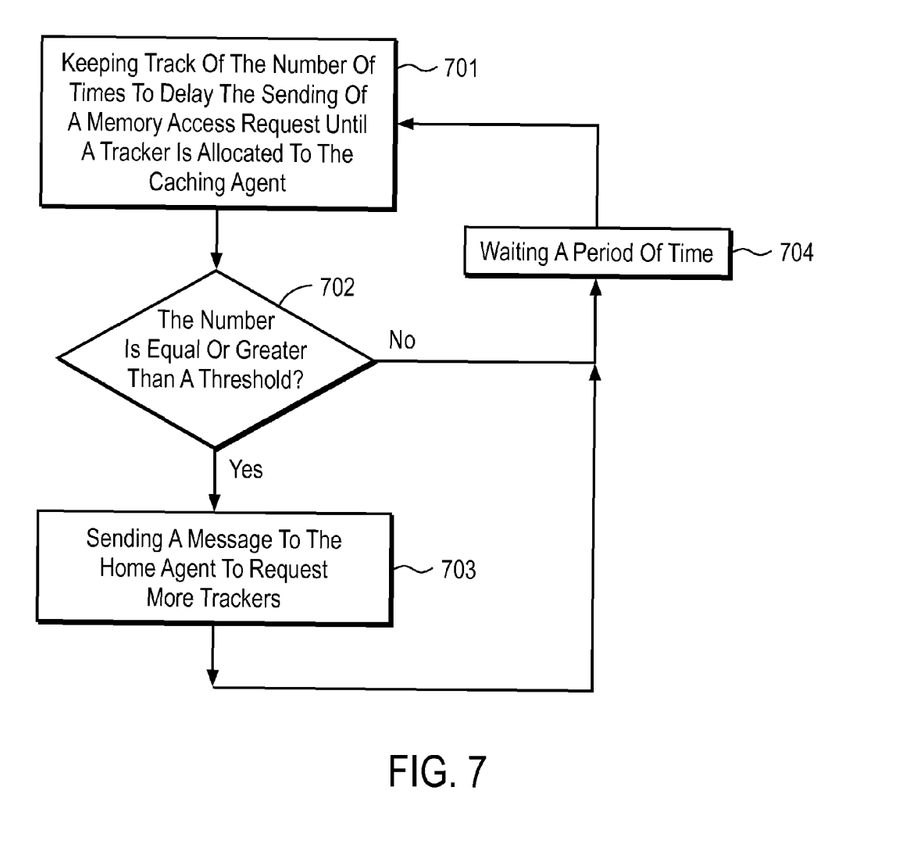
FIG. 7 is a flow diagram illustrating a mechanism for dynamic allocation of a home agent's tracker resources according to another embodiment of the present invention.

FIG. 7 is a flow diagram illustrating a mechanism for dynamic allocation of a home agent's trackers according to another embodiment of the present invention. At block 701, a caching agent keeps track of the number of times to delay the sending of a memory access request until a tracker is allocated to the caching agent. Again, the caching agent may use a counter to keep track of that number. At block 702, the caching agent compares the number with a threshold, for example 5. If the number is equal or greater than the threshold, then the caching agent sends an allocation-request message to the home agent to request more trackers to be allocated to it, at block 703. After block 703, the caching agent waits for a period of time (at block 704) and starts the process again from block 701. If the number is less than the threshold, determined at block 702, the caching agent waits for a period of time (at block 704) and starts the process again from block 701. On the home agent's side, if the home agent has free trackers available, the home agent sends an allocation-confirm message to the caching agent and allocate one or more trackers (e.g., a group) to the caching agent. Otherwise, the home agent sends an allocation-reject message to the caching agent.

Figure 8:
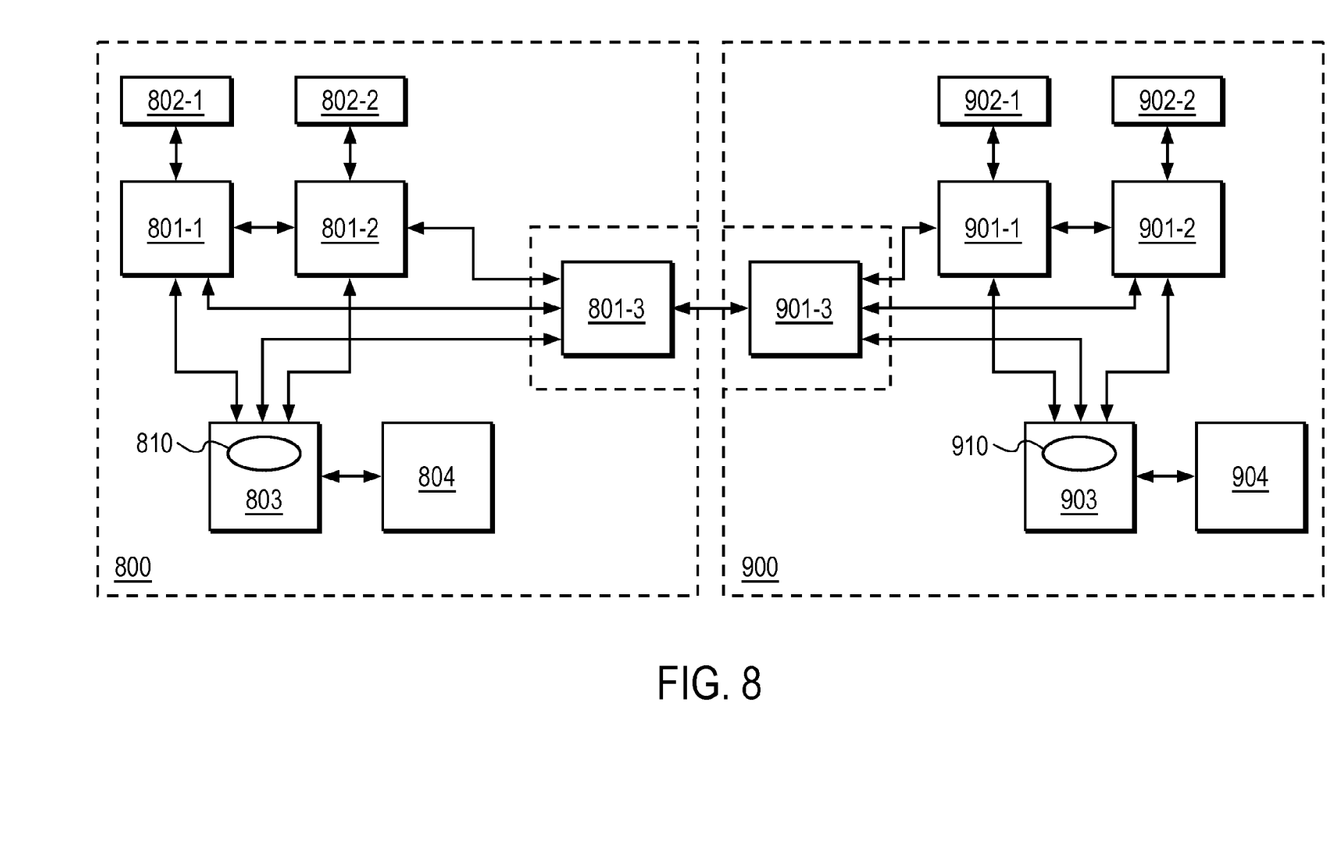
FIG. 8 is a block diagram illustrating a scalable mechanism of the present invention.

One way to expand the multiprocessor computing system shown in FIG. 2 is to add more caching agents and more memory controllers (together with home agents). The point-to-point link network 205, however, will become too complicated and hard to change. FIG. 8 is a block diagram illustrating a scalable mechanism of the present invention. Each of the clusters 800 and 900 is a multiprocessor computing system similar to the one shown in FIG. 2. For illustration purpose, each of the clusters 800 and 900 only has one home agent (810 for cluster 800, 910 for cluster 900) and three caching agents (801-1 through 801-3 for cluster 800, 901-1 through 901-3 for cluster 900). Caching agents 801-1, 801-2, 901-1, and 901-2 are regular caching agents which may be coupled with separate caches (802-1, 802-2, 902-1, and 902-2). Caching agent 801-3 is treated, however, as a proxy for caching agents 901-1 and 901-2 of cluster 900. That is, caching agents 901-1 and 901-2 each may send memory requests targeting home agent 810 provided caching agent 801-3 has trackers allocated from home agent 810 available for these requests. Similar to the dynamic tracker allocation mechanism discussed above, home agent 810 monitors tracker usage of each caching agents (801-1 through 801-3), determines which caching agent needs more trackers and which caching agent needs less, and dynamically allocates or retrieves trackers to/from these caching agents. Further, each caching agent may monitor the number of memory requests that cannot be sent because of the lacking of trackers, and may send message to the home agent to asking for more trackers. Similarly, caching agent 901-3 is treated as a proxy for caching agents 801-1 and 801-2 of cluster 800. This mechanism provides better scalability and provides efficient use of tracker resources.

Note that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behavioral level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; etc.

"Logic", as is used herein, may include, for example, software, hardware and/or combinations of hardware and software.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   monitoring a plurality of first agents' usage of a plurality of trackers, wherein, the plurality of trackers are divided into a plurality of groups, each group having a unique group index;
   determining whether it is necessary to reduce or increase the number of trackers allocated to each corresponding first agent;
   if it is necessary to reduce the number of trackers allocated to a first agent, deallocating at least one tracker from the first agent; and
   if it is necessary to increase the number of trackers allocated to the first agent, allocating at least one tracker to the first agent.

2. The method of claim 1, wherein the plurality of trackers are maintained on a second agent, which is connected with each of the plurality of first agents.

3. The method of claim 1, wherein each tracker of the plurality of trackers has a unique tracker index that includes a group index portion and an offset portion.

4. The method of claim 3, wherein allocating at least one tracker to the first agent comprises allocating a group of trackers to the first agent.

5. The method of claim 4, wherein deallocating at least one tracker from the first agent comprises deallocating a group of trackers from the first agent.

6. The method of claim 5, wherein the second agent maintains a separate mapping table for each first agent to record one or more indexes of groups allocated to the corresponding first agent.

7. The method of claim 6, wherein monitoring the plurality of first agents' usage of the plurality of trackers comprises maintaining a separate counter for each first agent to record the number of trackers being used by the corresponding first agent.

8. The method of claim 7, wherein determining whether it is necessary to reduce or increase the number of trackers allocated to each corresponding first agent comprises
   monitoring a difference between the total number of trackers allocated to the first agent and the number of trackers being used by the first agent;
   if the difference has been equal or greater than a first threshold for a first predetermined period of time, then it is necessary to reduce the number of trackers allocated to the first agent; and
   if the difference has been equal or less than a second threshold for a second predetermined period of time, then it is necessary to increase the number of trackers allocated to the first agent.

9. The method of claim 8, wherein the second agent controls a memory, wherein a first agent is allocated a tracker prior to sending a memory request to the second agent.

10. The method of claim 9, wherein one of the plurality of trackers is being used for one and only one outstanding memory request from one of the plurality of first agents.

11. The method of claim 10, wherein each of the plurality of first agents comprises a separate caching agent, and the second agent comprises a home agent.

12. A second agent, comprising:
    network interfaces to connect to a plurality of first agents;
    a plurality of trackers wherein, the plurality of trackers are divided into a plurality of groups, each group having a unique group index;
    a plurality of tables, each table to record one or more trackers allocated to a corresponding first agent; and
    logic to periodically determine, for each first agent, whether it is necessary to increase or decrease the number of trackers allocated to the corresponding first agent, and to allocate or deallocate one or more trackers in response to the determination.

13. The apparatus of claim 12, wherein the logic determines whether it is necessary to increase or decrease the number of trackers allocated to the corresponding first agent by comparing the total number of trackers allocated to the first agent and the number of trackers being used by the first agent.

14. The apparatus of claim 13, wherein to allocate or deallocate one or more trackers in response to the determination comprises
    deallocating one or more trackers from the first agent, if a difference between the total number of trackers allocated to the first agent and the number of trackers being used by the first agent has been equal or greater than a first threshold for a first predetermined period of time, and
    allocating one or more trackers to the first agent, if the difference has been equal or less than a second threshold for a second predetermined period of time.

15. The apparatus of claim 12, wherein each of the plurality of first agents comprises a separate caching agent, and the second agent comprises a home agent.

16. A computing system, comprising:
    a plurality of first agents, each agent coupled to a separate cache;
    a memory shared by the plurality of first agents;
    a second agent residing between the plurality of first agents and the memory, the memory being accessible by each of the plurality of first agents via the second agent, wherein the second agent maintains a plurality of trackers and includes a control logic, the control logic
    monitoring the plurality of first agents' usage of the plurality of trackers, determining whether it is necessary to reduce or increase the number of trackers allocated to each corresponding first agent, deallocating at least one tracker from a first agent if it is necessary to reduce the number of trackers allocated to the first agent, and allocating at least one tracker to the first agent if it is necessary to increase the number of trackers allocated to the first agent.

17. The computing system of claim 16, wherein the plurality of trackers are divided into a plurality of groups, each group having a unique group index.

18. The computing system of claim 17, wherein each tracker of the plurality of trackers has a unique tracker index that includes a group index portion and an offset portion.

19. The computing system of claim 18, wherein allocating at least one tracker to the first agent comprises allocating a group of trackers to the first agent.

20. The computing system of claim 19, wherein deallocating at least one tracker from the first agent comprises deallocating a group of trackers from the first agent.

21. The computing system of claim 20, wherein the second agent further maintains a separate table for each first agent to record indexes of groups allocated to the corresponding first agent.

22. The computing system of claim 16, wherein a first agent needs to send a memory request to the second agent prior to being allowed to access the memory.

23. The computing system of claim 22, wherein the first agent is allocated one of the plurality of trackers prior to sending the memory request.

24. The computing system of claim 23, wherein said one of the plurality of trackers is being used by the first agent while the memory request is outstanding.

25. The computing system of claim 24, wherein to determine whether it is necessary to reduce or increase the number of trackers allocated to each corresponding first agent comprises monitor a difference between the total number of trackers allocated to the first agent and the number of trackers being used by the first agent;

if the difference has been equal or greater than a first threshold for a first predetermined period of time, then it is necessary to reduce the number of trackers allocated to the first agent; and if the difference has been equal or less than a second threshold for a second predetermined period of time, then it is necessary to increase the number of trackers allocated to the first agent.

26. A method comprising:

determining, at a first agent, whether the first agent needs to request one or more trackers from a plurality of trackers maintained at a second agent, wherein the plurality of trackers are divided into a plurality of groups, each group including an equal number of trackers; and if it is determined that the first agent needs to request one or more trackers, sending a message to the second agent to request at least one tracker to be allocated to the first agent.

27. The method of claim 26, wherein requesting at least one tracker to be allocated to the first agent comprises requesting a group of trackers to be allocated to the first agent.

28. A method comprising:

determining, at a first agent, whether the first agent needs to request one or more trackers from a plurality of trackers maintained at a second agent, wherein, the plurality of trackers are divided into a plurality of groups each having a unique group index; and if it is determined that the first agent needs to request one or more trackers, sending a message to the second agent to request at least one tracker to be allocated to the first agent;

wherein the second agent controls a memory, wherein the first agent is allocated a tracker prior to sending a request to access the memory.

29. The method of claim 28, wherein the first agent maintains a counter associated with the second agent to record the number of times to delay the sending of a memory access request until a tracker is allocated to the first agent.

30. The method of claim 29, wherein determining, at the first agent, whether the first agent needs to request one or more trackers from the plurality of trackers maintained at the second agent comprises comparing a value of the counter with a threshold.

31. The method of claim 30, wherein the first agent comprises a caching agent and the second agent comprises a home agent.

32. An apparatus comprising:

a home agent maintaining a plurality of trackers;

a caching agent coupled with the home agent, wherein the caching agent determines whether the caching agent needs to request at least one tracker from the home agent; and if it is determined that the caching agent needs to request at least one tracker from the home agent, sends a message to the home agent to request at least one tracker.

33. The apparatus of claim 32, wherein the plurality of trackers are divided into a plurality of groups, each group including an equal number of trackers.

34. The apparatus of claim 33, wherein to request at least one tracker comprises to request at least one group of trackers.

35. The apparatus of claim 32 further comprises a memory controlled by the home agent, wherein the caching agent is allocated a tracker prior to sending a message to the home agent to request access to the memory.

36. The apparatus of claim 32, wherein the caching agent maintains a counter associated with the home agent to record the number of times to delay the sending of a memory access request until a tracker is allocated to the caching agent.

37. The apparatus of claim 36, wherein the caching agent determines whether the caching agent needs to request at least one tracker from the home agent by comparing a value of the counter with a threshold.

* * * * *